US007920511B2

United States Patent
Khan et al.

(10) Patent No.: US 7,920,511 B2
(45) Date of Patent: Apr. 5, 2011

(54) METHOD AND SYSTEM FOR MANAGING CHANNELS IN A WIRELESS COMMUNICATION SYSTEM

(75) Inventors: Farooq Khan, Allen, TX (US); Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 11/804,926

(22) Filed: May 21, 2007

(65) Prior Publication Data

US 2008/0101407 A1    May 1, 2008

Related U.S. Application Data

(60) Provisional application No. 60/855,441, filed on Oct. 31, 2006.

(51) Int. Cl.
*H04W 4/00* (2009.01)

(52) U.S. Cl. ........ 370/328; 370/203; 370/236; 370/249; 370/310.2

(58) Field of Classification Search ................... 370/203, 370/231, 236, 249, 310.2, 328, 329, 334, 370/339

See application file for complete search history.

(56) References Cited

U.S. PATENT DOCUMENTS

| | | | |
|---|---|---|---|
| 7,428,268 B2 * | 9/2008 | Shen et al. | 375/267 |
| 2005/0250512 A1 * | 11/2005 | Zhang et al. | 455/453 |
| 2007/0011550 A1 * | 1/2007 | Agrawal et al. | 714/746 |
| 2007/0249401 A1 * | 10/2007 | Kim et al. | 455/562.1 |
| 2008/0013610 A1 * | 1/2008 | Varadarajan et al. | 375/221 |
| 2008/0043867 A1 * | 2/2008 | Blanz et al. | 375/260 |
| 2008/0049596 A1 * | 2/2008 | Khojastepour et al. | 370/203 |
| 2008/0056414 A1 * | 3/2008 | Kim et al. | 375/347 |
| 2008/0101322 A1 * | 5/2008 | Prakash et al. | 370/342 |
| 2008/0125051 A1 * | 5/2008 | Kim et al. | 455/67.13 |
| 2008/0132281 A1 * | 6/2008 | Kim et al. | 455/562.1 |
| 2009/0067531 A1 * | 3/2009 | Lee et al. | 375/267 |
| 2009/0219865 A1 * | 9/2009 | Salzer et al. | 370/329 |

* cited by examiner

Primary Examiner — Kwang B Yao
Assistant Examiner — Nguyen Ngo

(57) ABSTRACT

A method of managing channels in a wireless communication system is provided. The method includes generating channel quality feedback comprising a maximum channel quality indicator (CQI) and a delta-CQI value at a subscriber station and transmitting the channel quality feedback to a base station.

26 Claims, 9 Drawing Sheets

600

| | RANK 1 | RANK 2 | RANK 3 | RANK 4 |
|---|---|---|---|---|
| LAYER 1 | CW1 | CW1 | CW1 | CW1 |
| LAYER 2 | | CW2 | CW1/CW2 | CW1 |
| LAYER 3 | | | CW2 | CW2 |
| LAYER 4 | | | | CW2 |

| | RANK 1 | RANK 2 | RANK 3 | RANK 4 |
|---|---|---|---|---|
| LAYER 1 | CW1 | CW1 | CW1 | CW1 |
| LAYER 2 | | CW2 | CW2 | CW2 |
| LAYER 3 | | | CW2 | CW2 |
| LAYER 4 | | | | CW2 |

|  | RANK 1 | RANK 2 | RANK 3 | RANK 4 |
|---|---|---|---|---|
| LAYER 1 | USER A CW1 | USER A CW1 | USER A CW1 | USER A CW1 |
| LAYER 2 |  | USER B CW1 | USER B CW1 | USER B CW1 |
| LAYER 3 |  |  | USER C CW1 | USER C CW1 |
| LAYER 4 |  |  |  | USER D CW1 |

|  | RANK 1 | RANK 2 | RANK 3 | RANK 4 |
|---|---|---|---|---|
| LAYER 1 | USER A CW1 | USER A CW1 | USER A CW1 | USER A CW1 |
| LAYER 2 |  | USER B CW1 | USER A CW2 | USER A CW2 |
| LAYER 3 |  |  | USER B CW1 | USER B CW1 |
| LAYER 4 |  |  |  | USER C CW1 |

FIG. 7B

METHOD AND SYSTEM FOR MANAGING CHANNELS IN A WIRELESS COMMUNICATION SYSTEM

CROSS-REFERENCE TO RELATED APPLICATION AND CLAIM OF PRIORITY

The present invention is related to the invention disclosed in U.S. Patent Application Ser. No. 60/855,441, titled "MIMO Feedback and Transmission in a Wireless Communication System," filed on Oct. 31, 2006. Patent Application Ser. No. 60/855,441 is assigned to the assignee of the present application. The subject matter disclosed in Patent Application Ser. No. 60/855,441 is hereby incorporated by reference into the present disclosure as if fully set forth herein.

The present application hereby claims priority under 35 U.S.C. §119(e) to Patent Application Ser. No. 60/855,441.

TECHNICAL FIELD OF THE INVENTION

The present disclosure relates generally to wireless communications and, more specifically, to a method and system for managing channels in a wireless communication system.

BACKGROUND OF THE INVENTION

Some currently-implemented wireless communication systems provide for multiple input/multiple output (MIMO) communication between a transmitter with M transmit antennas and a receiver with N receive antennas to improve the capacity and reliability of wireless communication channels. An M×N MIMO system such as this generally provides a linear increase in capacity with K, where K is the rank of the system and is defined as the minimum of the number of transmit antennas and the number of receive antennas (i.e., $K=\min(M,N)$).

However, although a system may be able to support 4×4 MIMO, rank-4 transmissions that include four MIMO layers are not always desirable. The MIMO channel experienced by the user equipment (UE) generally limits the maximum rank that can be used for transmission. In general, for weak users in the system, a lower rank transmission may be preferred over a higher rank transmission from throughput perspective. It is also possible that only a small fraction of UEs in the system may be equipped with four receive antennas.

Another aspect of a MIMO system is the amount of feedback overhead required. In an OFDM MIMO system, for example, multiple channel quality indicators (CQIs) may be required even for single-layer transmission to exploit frequency-selective multi-user scheduling gains. The introduction of multiple MIMO layers may then further increase the feedback overhead. Therefore, there is a need in the art for an improved method for managing channels in a wireless communication system.

SUMMARY OF THE INVENTION

A method for managing channels in a wireless communication system is provided. According to an advantageous embodiment of the present disclosure, the method includes generating channel quality feedback comprising a maximum channel quality indicator (CQI) and a delta-CQI value at a subscriber station and transmitting the channel quality feedback to a base station.

According to another embodiment of the present disclosure, a subscriber station is provided that includes a rank and layer order indication (RLOI) table and a feedback provider. The RLOI table is operable to store a plurality of RLOI values and a plurality of layer orders. Each RLOI value has a corresponding layer order. The feedback provider is operable to access the RLOI table to determine an RLOI value for a communication session and to generate channel quality feedback comprising a maximum CQI, a delta-CQI value and the RLOI value for the communication session.

According to yet another embodiment of the present disclosure, a base station is provided that includes an RLOI table and a configuration block. The RLOI table is operable to store a plurality of RLOI values and a plurality of layer orders. Each RLOI value has a corresponding layer order. The configuration block is operable to access the RLOI table and to process channel quality feedback that comprises a maximum CQI, a delta-CQI value and an RLOI value for a communication session received from a subscriber station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A-B each illustrate an example of a codeword transmission structure in a single-user 4×4 MIMO system according to an embodiment of the present disclosure;

FIGS. 7A-B each illustrate an example of a codeword transmission structure in a multi-user 4×4 MIMO system according to an embodiment of the present disclosure;

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
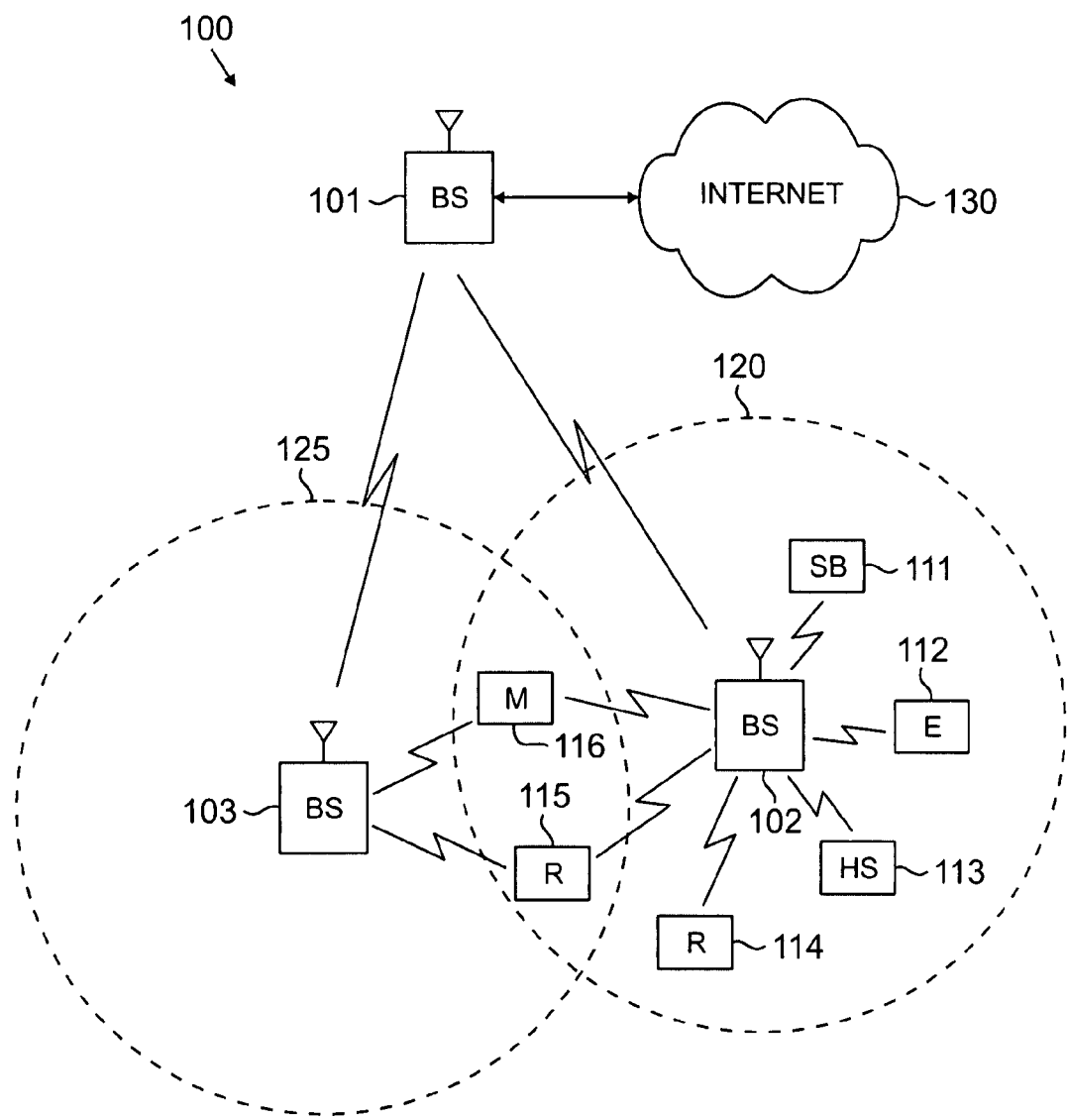
FIG. 1 illustrates an orthogonal frequency division multiplexing (OFDM) wireless network that is capable of managing channels according to an embodiment of the present disclosure.

FIG. 1 illustrates an exemplary Orthogonal Frequency Division Multiplexing (OFDM) wireless network 100 that is capable of managing channels according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16, 802.20, or 802.11 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

In accordance with an embodiment of the present disclosure, each subscriber station 111-116 is operable to minimize the amount of channel quality feedback provided to a base station 101-103 during multi-channel communication by including a maximum channel quality indicator (CQI) and at least one delta-CQI value instead of including full CQIs for every channel. Based on the delta-CQI value, base stations 101-103 are operable to determine or estimate the CQI for each channel other than the channel with the maximum CQI. Each base station 101-103 is also operable to configure MIMO transmissions based on the feedback provided by subscriber stations 111-116.

Figure 2:
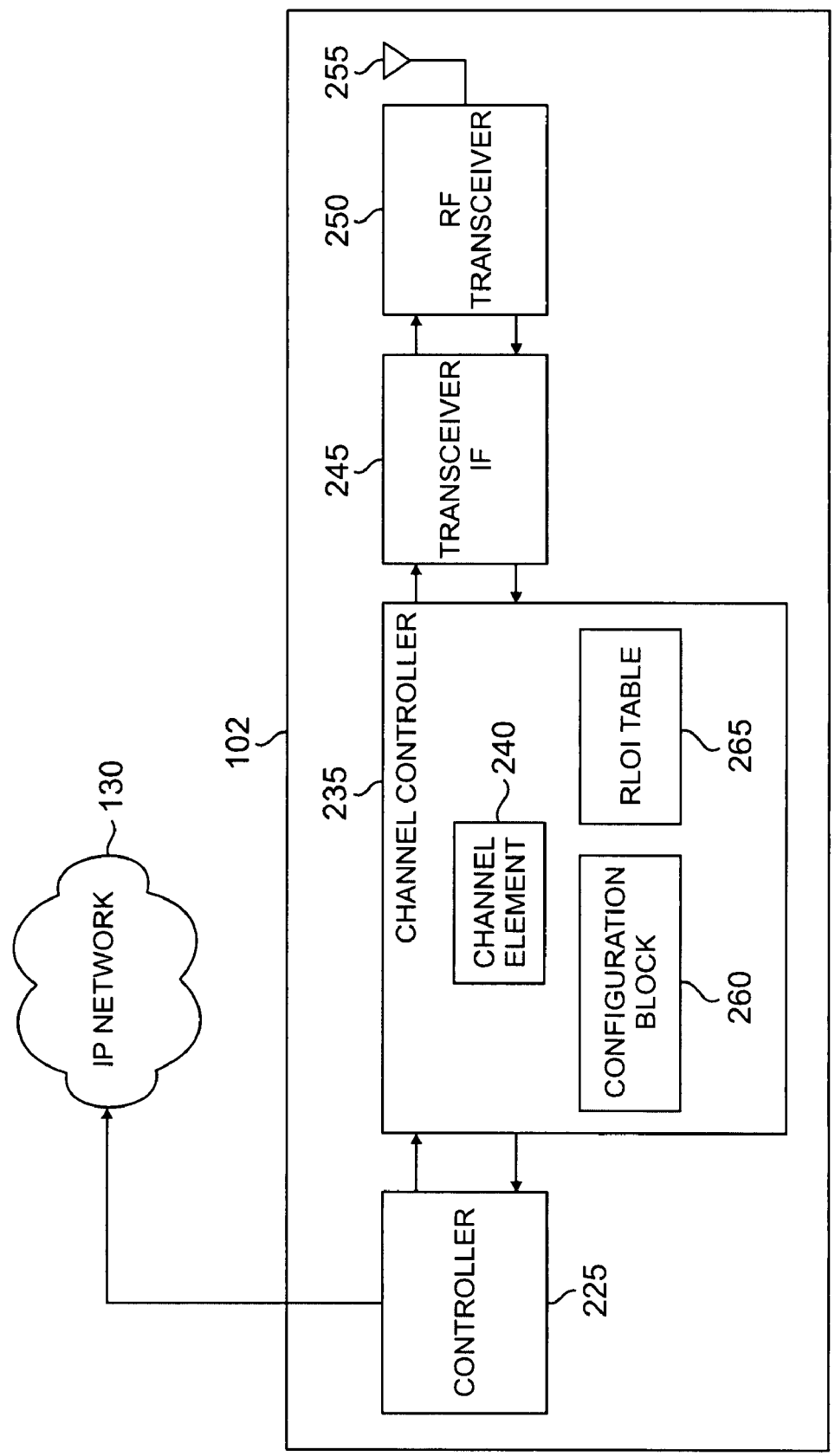
FIG. 2 illustrates a base station that is capable of managing channels according to an embodiment of the present disclosure.

FIG. 2 illustrates exemplary base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255.

Controller 225 comprises processing circuitry and memory capable of executing an operating program that controls the overall operation of base station 102. In an embodiment, controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correaction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In accordance with an embodiment of the present disclosure, channel controller 235 comprises a configuration block 260 and a rank and layer order indication (RLOI) table 265, in addition to channel element 240. Configuration block 260 is operable to configure MIMO transmissions for base station 102 based on the channel quality feedback provided by subscriber stations 111-116 and based on data stored in RLOI table 265.

RLOI table 265 is operable to store data that may be used by configuration block 260 in determining a rank and a layer order. The layer order comprises an ordering of the layers used in communicating with the subscriber station 111-116 based on the CQI for each layer. An RLOI value provided in the channel quality feedback from subscriber stations 111-116 may be used by configuration block 260 in order to identify the rank and layer order stored in RLOI table 265. Configuration block 260 is then operable to configure MIMO transmissions based on the rank, layer order and other information in the channel quality feedback, as described in more detail below.

For one embodiment, RLOI table 265 may comprise one set of data for use in processing feedback provided by all subscriber stations 111-116. For an alternative embodiment, RLOI table 265 may comprise a separate set of data for each subscriber station 111-116.

For one embodiment, configuration block 260 is also operable to determine whether to use single-user MIMO mode or multi-user MIMO mode in communicating with subscriber stations 111-116. As described in more detail below in connection with FIGS. 6A-B and 7A-B, configuration block 260 may use any suitable single-user codeword transmission structure when single-user MIMO mode is selected and any suitable multi-user codeword transmission structure when multi-user MIMO mode is selected. Configuration block 260 may also be operable to negotiate a maximum rank for communications between base station 102 and subscriber stations 111-116.

Figure 3:
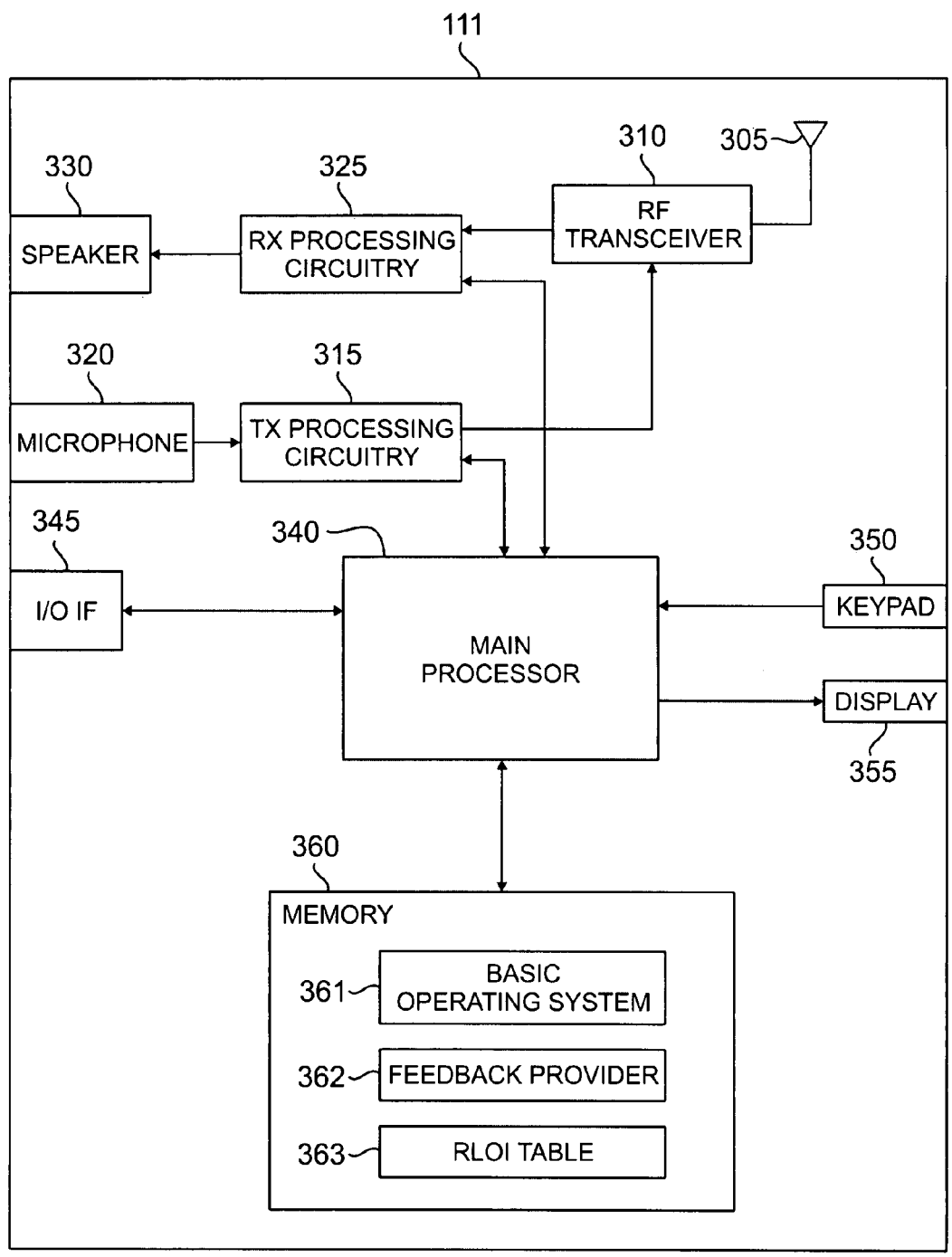
FIG. 3 illustrates a subscriber station that is capable of managing channels according to an embodiment of the present disclosure.

FIG. 3 illustrates wireless subscriber station 111 according to an advantageous embodiment of the present disclosure. Wireless subscriber station 111 comprises antenna array 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361, feedback provider 362 and RLOI table 363.

Radio frequency (RF) transceiver 310 receives from antenna array 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna array 305.

In an advantageous embodiment of the present disclosure, main processor 340 is a microprocessor or microcontroller. Memory 360 is coupled to main processor 340. According to an advantageous embodiment of the present disclosure, part of memory 360 comprises a random access memory (RAM) and another part of memory 360 comprises a non-volatile memory, such as Flash memory, which acts as a read-only memory (ROM).

Main processor 340 executes basic operating system (OS) program 361 stored in memory 360 in order to control the overall operation of wireless subscriber station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is also operable to execute feedback provider 362. Feedback provider 362 is operable to measure a CQI for each layer over which data is transmitted by base station 102 to subscriber station 111 and to order the layers based on the CQIs. The layer with the maximum CQI may be referred to as the maximum layer, while any remaining layers may be referred to as non-maximum layers.

For ranks greater than one, feedback provider 362 is also operable to generate channel quality feedback that comprises the maximum CQI, which corresponds to the maximum layer, and that comprises at least one delta-CQI value, which may be used to determine or estimate the CQIs for the non-maximum layer(s). When subscriber station 111 is communicating using a rank of two, the delta-CQI value comprises the difference between the maximum CQI and the CQI for the worst layer. However, when subscriber station 111 is communicating using a rank of three or more, a single delta-CQI value may comprise an average of the differences between each pair of CQIs for the ordered layers. Thus, when the rank is two, the delta-CQI value may be used to determine the CQI of the second layer, and when the rank is three or more, the delta-CQI value may be used to estimate the CQIs of the non-maximum layers.

For an alternative embodiment, a delta-CQI value may be provided for each non-maximum layer. Thus, instead of averaging the differences between the pairs of CQIs, those differences may be included as delta-CQI values in the channel quality feedback. For this embodiment, the delta-CQI values may be used to determine the CQIs of the non-maximum layers. However, this embodiment also increases the amount of feedback to be provided.

The channel quality feedback generated by feedback provider 362 also comprises an RLOI value. Based on the rank and the layer order, feedback provider 362 is operable to access RLOI table 363 in order to determine the RLOI value. Base station 102 may then access its RLOI table 265 using the RLOI value in order to determine the rank and layer order. Thus, the data stored in RLOI table 363 is also stored in RLOI table 265.

For some embodiments, feedback provider 362 may also be operable to determine a delta-$CQI_{SIC}$ value, and the channel quality feedback generated by feedback provider 362 may also comprise the delta-$CQI_{SIC}$ value. The delta-$CQI_{SIC}$ value is operable to indicate the successive interference cancellation (SIC) gain.

For some embodiments, the rank and layer order may be the same for each sub-band used in communicating in order to reduce feedback overhead. As used herein, a "sub-band" comprises a plurality of resource blocks selected for CQI feedback purposes. However, for other embodiments, a rank and layer order may be provided for each sub-band in order to provide greater flexibility. The size of a sub-band may be determined based on desired performance and a desired amount of feedback overhead. Thus, a larger sub-band size may be used to reduce feedback overhead; however, performance is also decreased due to variations within the sub-band that would not be reported separately.

For a particular example, for an OFDMA system with ten sub-bands and a rank of four, a full CQI of five bits may be provided for each layer for each sub-band, resulting in a feedback overhead of 200 bits. However, by reporting only a single full CQI (i.e., a maximum CQI) and a delta-CQI value instead of a full CQI for each layer, the feedback overhead may be limited to five bits for the maximum CQI, three bits for the delta-CQI, and a number of bits to provide rank and layer order. The number of bits for rank and layer order may be determined as described below in connection with FIG. 5. This amount of feedback may be provided for all sub-bands together to further reduce feedback overhead or for each sub-band individually to provide greater flexibility.

Figure 4:
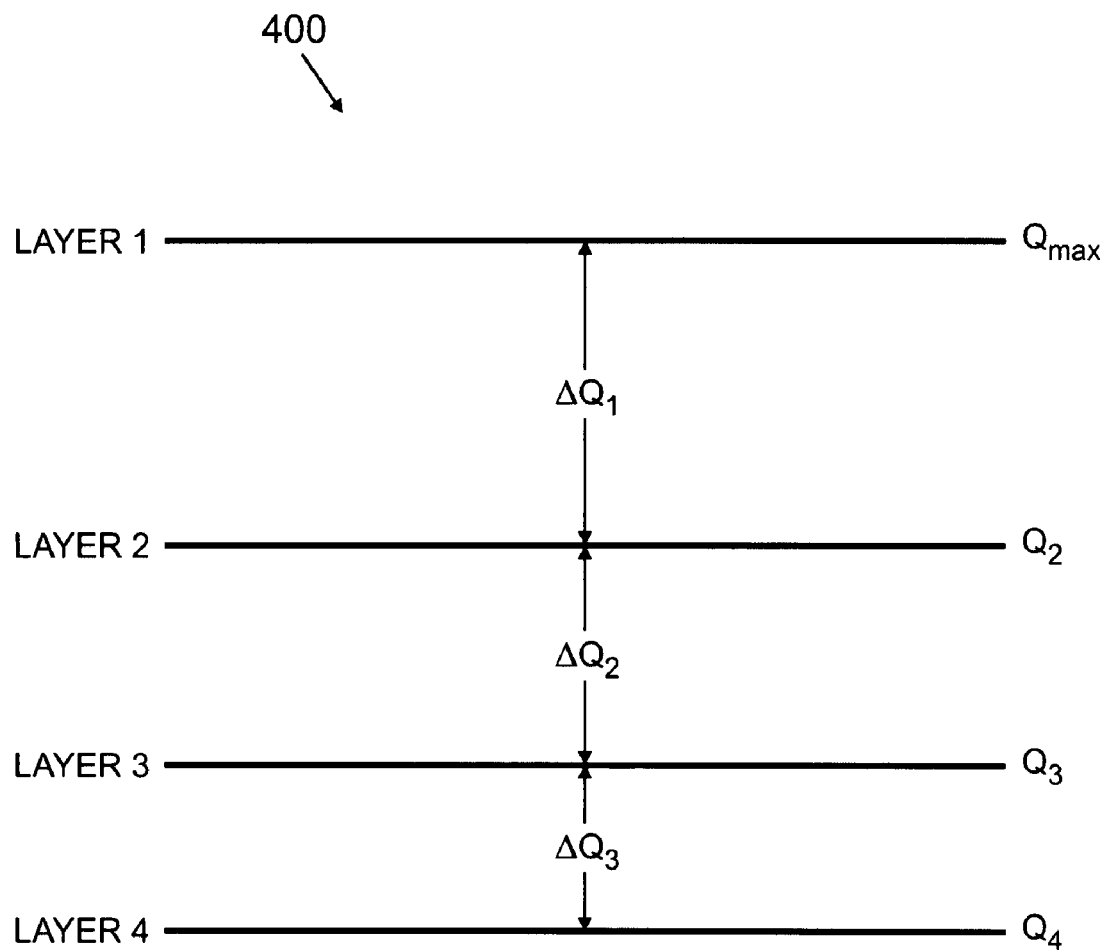
FIG. 4 illustrates an example of ordering layers for use in providing feedback from the subscriber station of FIG. 3 according to an embodiment of the present disclosure.

FIG. 4 illustrates an example 400 of ordering layers for use in providing feedback from subscriber station 111 according to an embodiment of the present disclosure. For the illustrated embodiment, a rank of four is used. However, it will be understood that the following description may be applied to other ranks as well. For one embodiment, feedback provider 362 may be operable to order the layers based on a linear minimum mean squared error (LMMSE) approach.

After ordering, the layers are designated Layer 1, Layer 2, Layer 3 and Layer 4. Thus, the maximum CQI ($Q_{max}$) corresponds to Layer 1, which is the maximum layer. Similarly, the second highest CQI ($Q_2$) corresponds to Layer 2, the third highest CQI ($Q_3$) corresponds to Layer 3, and the worst CQI ($Q_4$) corresponds to Layer 4. In addition, the difference between $Q_{max}$ and $Q_2$ is designated $\Delta Q_1$, the difference between $Q_2$ and $Q_3$ is designated $\Delta Q_2$, and the difference between $Q_3$ and $Q_4$ is designated $\Delta Q_3$. Thus, the actual delta-CQIs are $\Delta Q_1$, $\Delta Q_2$ and $\Delta Q_3$. Using these representations, an average delta-CQI (or $\Delta Q$) may be determined as follows:

$$\Delta Q = \frac{\Delta Q_1 + \Delta Q_2 + \Delta Q_3}{3}.$$

For the embodiment in which feedback provider 362 is operable to determine a delta-$CQI_{SIC}$ value, the average CQI on layers other than Layer 1 for rank-4, rank-3 and rank-2 single-user transmission, respectively, assuming SIC may be defined as follows:

$$Q_{av}^{2,3,4} = Q_{max} + 1.5\Delta Q + \Delta Q_{SIC}$$

$$Q_{av}^{2,3} = Q_{max} + 1.5\Delta Q + \Delta Q_{SIC}$$

$$Q_{av}^{2} = Q_{max} + \Delta Q + \Delta Q_{SIC},$$

where delta-$CQI_{SIC}$ ($\Delta Q_{SIC}$) is the average SIC gain experienced by layers other than the layer assumed to be cancelled. For example, when Layer i is assumed to be cancelled, $\Delta Q_{SICi}$ is given as:

$$\Delta Q_{SICi} = \frac{1}{(N-1)} \sum_{j=1, j \neq i}^{N} \Delta Q_{SICij},$$

where $\Delta Q_{SICij}$ is the SIC gain seen by Layer j when Layer i is assumed to be cancelled. Also, N denotes the total number of layers.

For another embodiment, the average SIC gain may be calculated and fed back as follows:

$$\Delta Q_{SIC} = \frac{1}{N} \sum_{i=1}^{N} \Delta Q_{SICi},$$

where $\Delta Q_{SICi}$ is the average SIC gain seen by layers other than Layer i when Layer i is assumed to be cancelled.

Figure 5:
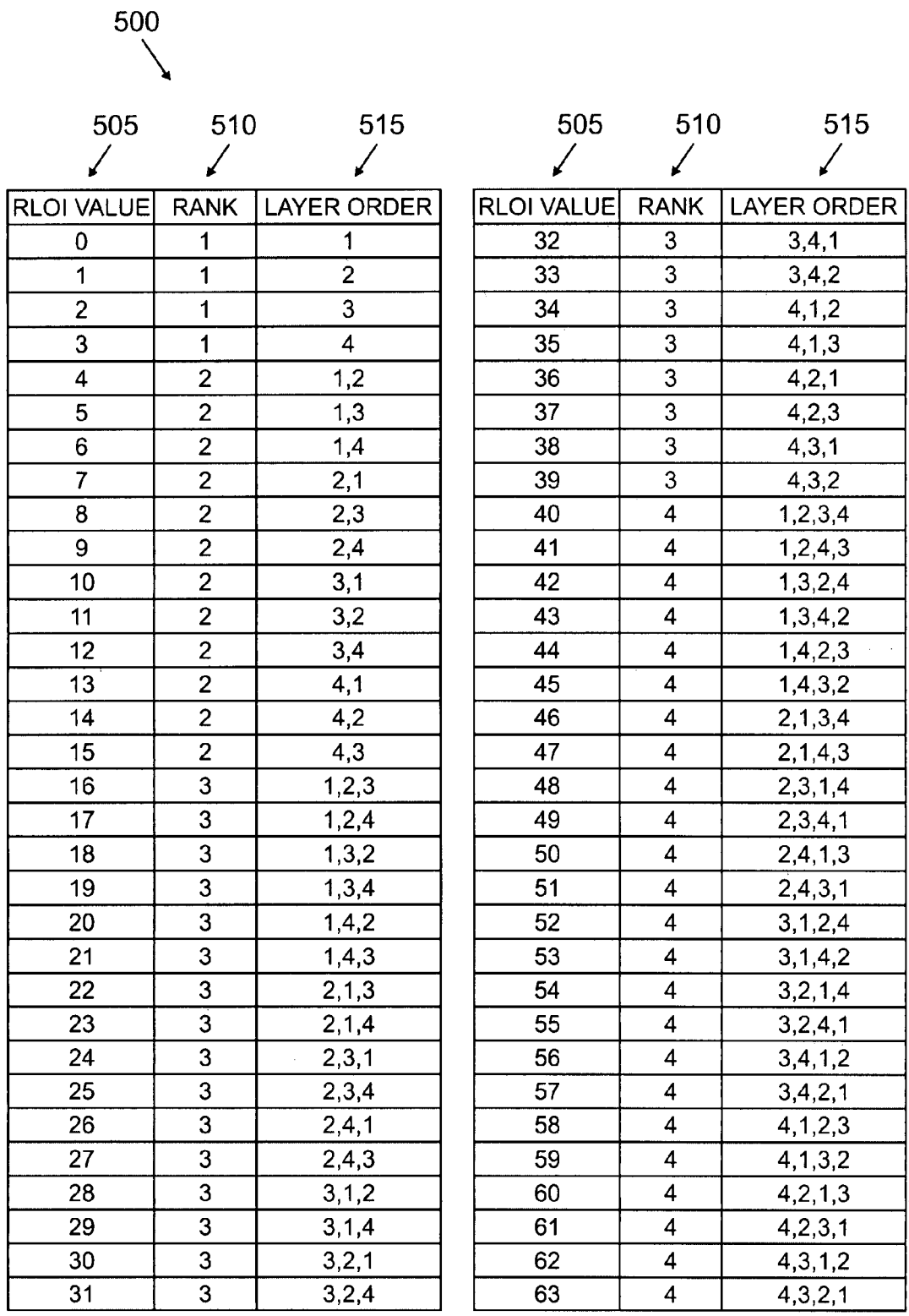
FIG. 5 illustrates a rank and layer order indication (RLOI) table for use in providing feedback from the subscriber station of FIG. 3 and processing the feedback in the base station of FIG. 2 according to an embodiment of the present disclosure.

FIG. 5 illustrates a rank and layer order indication (RLOI) table 500 for use in providing feedback from subscriber station 111 and for use in processing the feedback in base station 102 according to an embodiment of the present disclosure. Thus, as described above in connection with FIGS. 2 and 3, RLOI table 500 may represent one example of both RLOI table 265 and RLOI table 363.

For the illustrated embodiment, RLOI table 500 comprises a column of RLOI values 505, a column of ranks 510, and a column of layer orders 515. Although included for ease of explanation, it will be understood that the rank 510 need not be explicitly stored in the RLOI table 500 because the layer order 515 indicates the rank through the number of layers included.

As described above in connection with FIG. 3, feedback provider 362 is operable to determine the rank 510 and layer order 515 and to generate channel quality feedback comprising the RLOI value 505 corresponding to the determined rank 510 and layer order 515. Then, as described above in connection with FIG. 2, configuration block 260 of base station 102 is operable to determine the rank 510 and layer order 515 based on the RLOI value 505 provided in the channel quality feedback.

For example, if feedback provider 362 determines that the rank 510 is three and the layer order 515 is 2, 3, 1 (i.e., the second layer is the maximum layer, the third layer is the second best layer, and the first layer is the worst layer), feedback provider 362 includes an RLOI value 505 of 24 in the channel quality feedback. Configuration block 260 then receives the RLOI value 505 of 24 and, based on that value, determines that the rank 510 is three and the layer order 515 is 2, 3, 1. Thus, with a single parameter (RLOI value 505), the channel quality feedback may indicate to base station 102 both the rank 510 and layer order 515.

It will be understood that RLOI table 500 is one example of a particular format for an RLOI table and that RLOI table 265 and/or 363 may be arranged in any suitable way. For example, the values stored in the layer order column 515 (and the corresponding values stored in the rank column 510) may be ordered differently or the information may be otherwise suitably stored without departing from the scope of this disclosure.

The number, RLOI, of rank and layer order combinations that are possible may be determined as follows:

$$RLOI = \frac{L!}{(L-R)!},$$

where L is the maximum number of layers supported and R is the rank. For example, for a 4×4 MIMO system in which L=4, the RLOI is 4, 12, 24 and 24 for rank-1, rank-2, rank-3 and rank-4, respectively. For this embodiment, which corresponds to the illustrated RLOI table 500, the total number of possible combinations is 4+12+24+24, or 64. Thus, six feedback bits may be used to provide the RLOI value 505.

For a particular example, a subscriber station 111-116, may comprise two transmit antennas, and the rank, layer order and CQI feedback may be provided in accordance with the following table:

| | RLOI | CQI Information | Total Feedback Overhead |
|---|---|---|---|
| Rank-1 | 2 | $CQI_{max}$ | 2-bit RLOI + 5-bit $CQI_{max}$ |
| Rank-2 | 2 | $CQI_{max} + \Delta Q$ | 2-bit RLOI + 5-bit $CQI_{max}$ + 3-bit $\Delta Q$ |

Thus, for the above example, the maximum feedback overhead is ten bits.

For another particular example, a subscriber station 111-116, may comprise four transmit antennas, and the rank, layer order and CQI feedback may be provided in accordance with the following table:

| | RLOI | CQI Information | Total Feedback Overhead |
|---|---|---|---|
| Rank-1 | 4 | $CQI_{max}$ | 2-bit RLOI + 5-bit $CQI_{max}$ |
| Rank-2 | 12 | $CQI_{max} + \Delta Q$ | 4-bit RLOI + 5-bit $CQI_{max}$ + 3-bit $\Delta Q$ |
| Rank-3 | 24 | $CQI_{max} + \Delta Q$ | 6-bit RLOI + 5-bit $CQI_{max}$ + 3-bit $\Delta Q$ |
| Rank-4 | 24 | $CQI_{max} + \Delta Q$ | 6-bit RLOI + 5-bit $CQI_{max}$ + 3-bit $\Delta Q$ |

Thus, for the above example, the maximum feedback overhead is fourteen bits.

For one embodiment, subscriber stations 111-116 and base stations 101-103 may be operable to negotiate a maximum rank for communications between them. For example, subscriber station 111 and base station 102 may use higher layer signaling to negotiate the maximum rank that may be supported in their communications. For this embodiment and continuing with the four transmit antenna example given above, when subscriber station 111 supports a lower maximum rank, the maximum feedback overhead is reduced. For example, when a maximum rank of two is negotiated, the transmission rank can be either one or two. The number of RLOI values for rank one is four, while the number of RLOI values for rank two is 12. This means a 4-bit RLOI will be sufficient to indicate the sixteen RLOI values. When the maximum rank is negotiated as one, the number of RLOI values is only four and a 2-bit RLOI value is sufficient. Thus, the total amount of feedback for rank one and rank two, from the above table, is seven bits and twelve bits, respectively.

In general, weak users (i.e., subscriber stations 111-116) use lower rank transmissions. The bit-cost for feedback overhead for weak users is generally higher relative to strong users. This is a result of the weak users needing to transmit at higher power to provide the same reliability, which generates higher inter-cell interference to neighboring cells. Also, in some situations, weak users are power-limited and may not have power headroom to transmit a larger amount of feedback. Thus, as described above, for these and other similar situations, negotiating a lower maximum rank allows the maximum feedback overhead to be reduced thereby alleviating the large-feedback problems.

FIGS. 6A-B illustrate examples of codeword transmission structures 600 and 650 in a single-user 4×4 MIMO system according to an embodiment of the present disclosure. For the embodiments illustrated in FIGS. 6A and 6B, the layers are assumed to have been ordered. Thus, Layer 1 represents the maximum layer, followed by Layers 2 and 3, with Layer 4 representing the worst layer. Therefore, the physical or virtual antennas corresponding to these layers may be different.

For the embodiment illustrated in FIG. 6A, configuration block 260 is operable to configure the MIMO transmissions such that a first codeword (CW1) is provided on Layer 1 for a rank of one and a first codeword is provided on Layer 1 and a second codeword (CW2) is provided on Layer 2 for a rank of two. For a rank of three, a first codeword is provided on Layer 1 and a second codeword is provided on Layer 3, while either the first or second codeword may be provided on Layer 2. For a rank of four, a first codeword is provided on Layer 1 and on Layer 2, and a second codeword is provided on Layer 3 and on Layer 4.

Therefore, for a rank greater than one, two codewords may be transmitted. In addition, for this embodiment, it will be understood that configuration block 260 has knowledge of a CQI for each layer and has flexibility in deciding mapping of codewords to layers.

For the embodiment illustrated in FIG. 6B, configuration block 260 is operable to configure the MIMO transmissions such that a first codeword is provided on Layer 1 for a rank of one and a first codeword is provided on Layer 1 and a second codeword is provided on Layer 2 for a rank of two. For a rank of three, a first codeword is provided on Layer 1 and a second codeword is provided on Layer 2 and on Layer 3. For a rank of four, a first codeword is provided on Layer 1, and a second codeword is provided on Layer 2, on Layer 3 and on Layer 4. Thus, for this embodiment, Layer 1 provides the first codeword, while any remaining layers provide the second codeword.

For this embodiment, for the case of rank-4 single-user MIMO transmission, the first codeword transmitted on Layer 1 uses modulation and coding according to $CQI_{max}$. The second codeword transmitted on Layers 2-4 may use modulation and coding according to the following CQI averaged over Layers 2-4:

$$Q_{av}^{2,3,4} = \frac{Q_2 + Q_3 + Q_4}{3} = \frac{Q_{max} + \Delta Q + Q_{max} + 2\Delta Q + Q_{max} + 3\Delta Q}{3} = \frac{3Q_{max} + 6\Delta Q}{3} = Q_{max} + 2\Delta Q.$$

Similarly, when the rank is two, the first codeword is transmitted on Layer 1 and the second codeword is transmitted on Layer 2. The average CQI for selecting modulation and coding for the second codeword for this situation may be defined as follows:

$$Q_{av}^2 = Q_{max} + \Delta Q.$$

When the rank is three, the first codeword is transmitted on Layer 1 and the second codeword is transmitted on Layers 2-3. The average CQI for selecting modulation and coding for the second codeword for this situation may be defined as follows:

$$Q_{av}^{2,3} = Q_{max} + 1.5\Delta Q$$

When the CQIs are calculated based on an LMMSE receiver, it will be understood that the delta-CQI will be a negative number because the CQIs for Layers 2-4 are lower relative to Layer 1.

FIGS. 7A-B illustrate examples of codeword transmission structures 700 and 750 in a multi-user 4×4 MIMO system according to an embodiment of the present disclosure. For the embodiment illustrated in FIG. 7A, configuration block 260 is operable to configure the MIMO transmissions such that, for a rank of one, a first codeword is provided on Layer 1 to User A. For a rank of two, a first codeword is provided on Layer 1 to User A, and the first codeword is provided on Layer 2 to User B. For a rank of three, a first codeword is provided on Layer 1 to User A, the first codeword is provided on Layer 2 to User B, and the first codeword is provided on Layer 3 to User C. For a rank of four, a first codeword is provided on Layer 1 to User A, the first codeword is provided on Layer 2 to User B, the first codeword is provided on Layer 3 to User C, and the first codeword is provided on Layer 4 to User D. Thus, in this case, a single user, two users, three users and four users are scheduled under rank-1, rank-2, rank-3 and rank-4, respectively.

In this embodiment, configuration block 260 has the rank, layer ordering and channel quality information from multiple subscriber stations 111-116 according to the feedback structure described previously. For example, when a 4×4 subscriber station reports a rank of two, along with layer order information and CQI information ($Q_{max}$ and $\Delta Q$), configuration block 260 may schedule this subscriber station in a single-user or multi-user MIMO mode. In the case of single-user MIMO, the two best reported layers are used for transmission, with the first layer MCS selected based on $Q_{max}$ and the second layer MCS selected based on $Q_{max}$ and $\Delta Q$. In the case of multi-user MIMO, configuration block 260 may schedule this subscriber station on the best-reported layer and another subscriber station on a second layer. In the case of more than one subscriber station reporting the same first-layer preference, configuration block 260 may schedule a subscriber station on the second best layer (or even third and fourth for rank-4).

For the embodiment illustrated in FIG. 7B, configuration block 260 is operable to configure the MIMO transmissions such that, for a rank of one, a first codeword is provided on Layer 1 to User A. For a rank of two, a first codeword is provided on Layer 1 to User A, and the first codeword is provided on Layer 2 to User B. For a rank of three, a first codeword is provided on Layer 1 to User A, a second codeword is provided on Layer 2 to User A, and the first codeword is provided on Layer 3 to User B. For a rank of four, a first codeword is provided on Layer 1 to User A, a second codeword is provided on Layer 2 to User A, the first codeword is provided on Layer 3 to User B, and the first codeword is provided on Layer 4 to User C.

In this case, configuration block 260 has full flexibility in scheduling, pairing and mapping the subscriber stations to available MIMO layers. For example, under rank-3, a first subscriber station may be allocated two layers and a second subscriber station a single layer, or vice versa. Similarly, under rank-4, the four MIMO layers may be shared among multiple subscriber stations with multiple layers potentially allocated to a single subscriber station. It will be understood that for subscriber stations to be paired in multi-user MIMO mode as illustrated in FIG. 7B, the subscriber stations report rank and corresponding layers.

Figure 8:
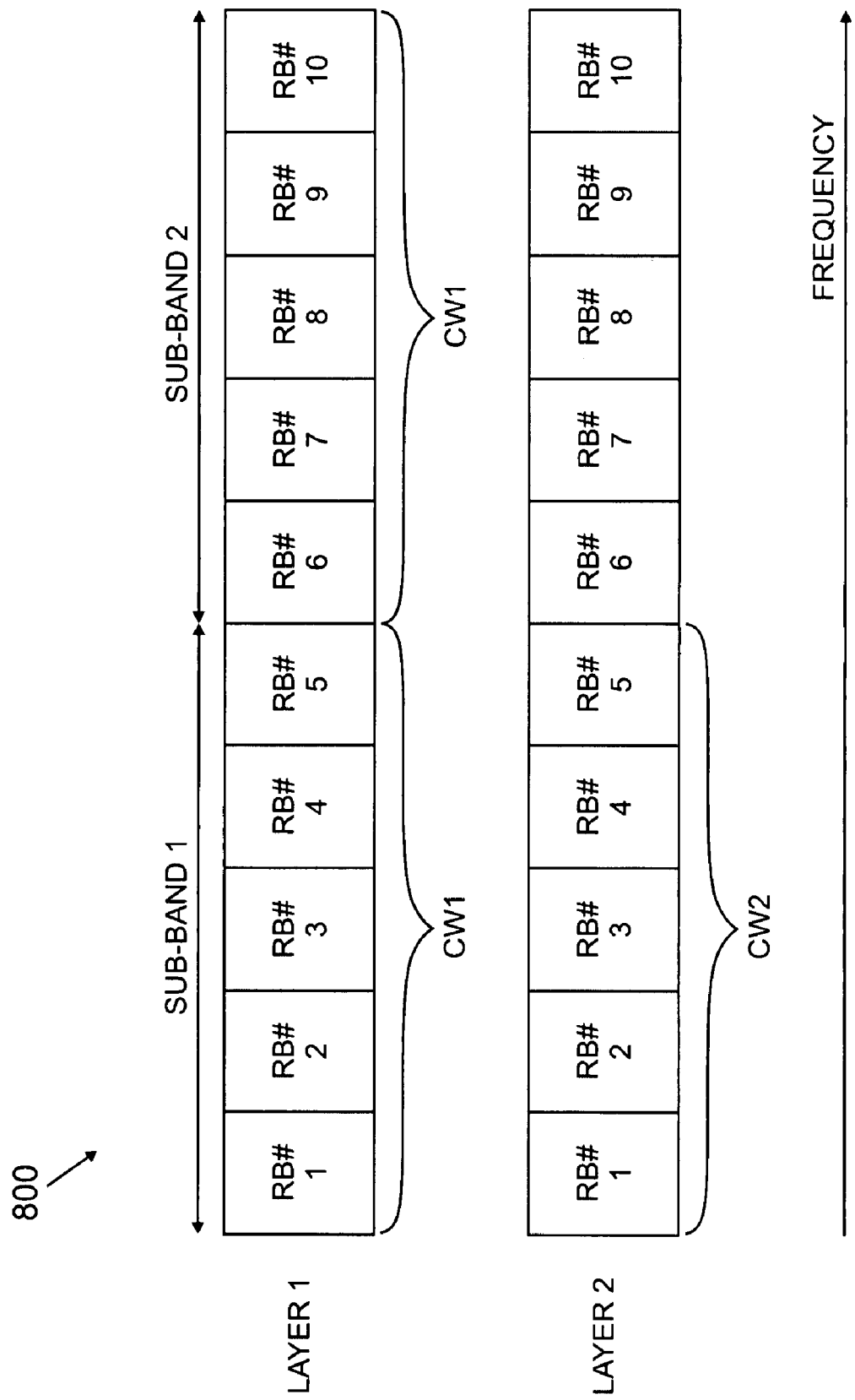
FIG. 8 illustrates an example of the transmission of two codewords with different ranks on different sub-bands according to an embodiment of the present disclosure.

FIG. 8 illustrates an example 800 of the transmission of two codewords with different ranks on different sub-bands to a subscriber station, such as subscriber station 111, according to an embodiment of the present disclosure. For the illustrated embodiment, Sub-band 1 comprises five resource blocks on Layer 1 and on Layer 2 and Sub-band 2 comprises five resource blocks on Layer 1 and on Layer 2. Each resource block may comprise a suitable number of sub-carriers. It will be understood that each sub-band may comprise any suitable number of resource blocks.

For the illustrated embodiment, subscriber station ill may support a rank of two on Sub-band 1 and a rank of one on Sub-band 2. For Sub-band 1, a first codeword may be provided on Layer 1 and a second codeword may be provided on Layer 2. For Sub-band 2, the first codeword may be provided on Layer 1, while the second codeword is not provided because Sub-band 2 does not support a second layer.

Thus, each sub-band may have its own rank. For this embodiment, configuration block 260 is operable to transmit a different number of codewords on each sub-band in accordance with the ranks for each of those sub-bands.

Figure 9:
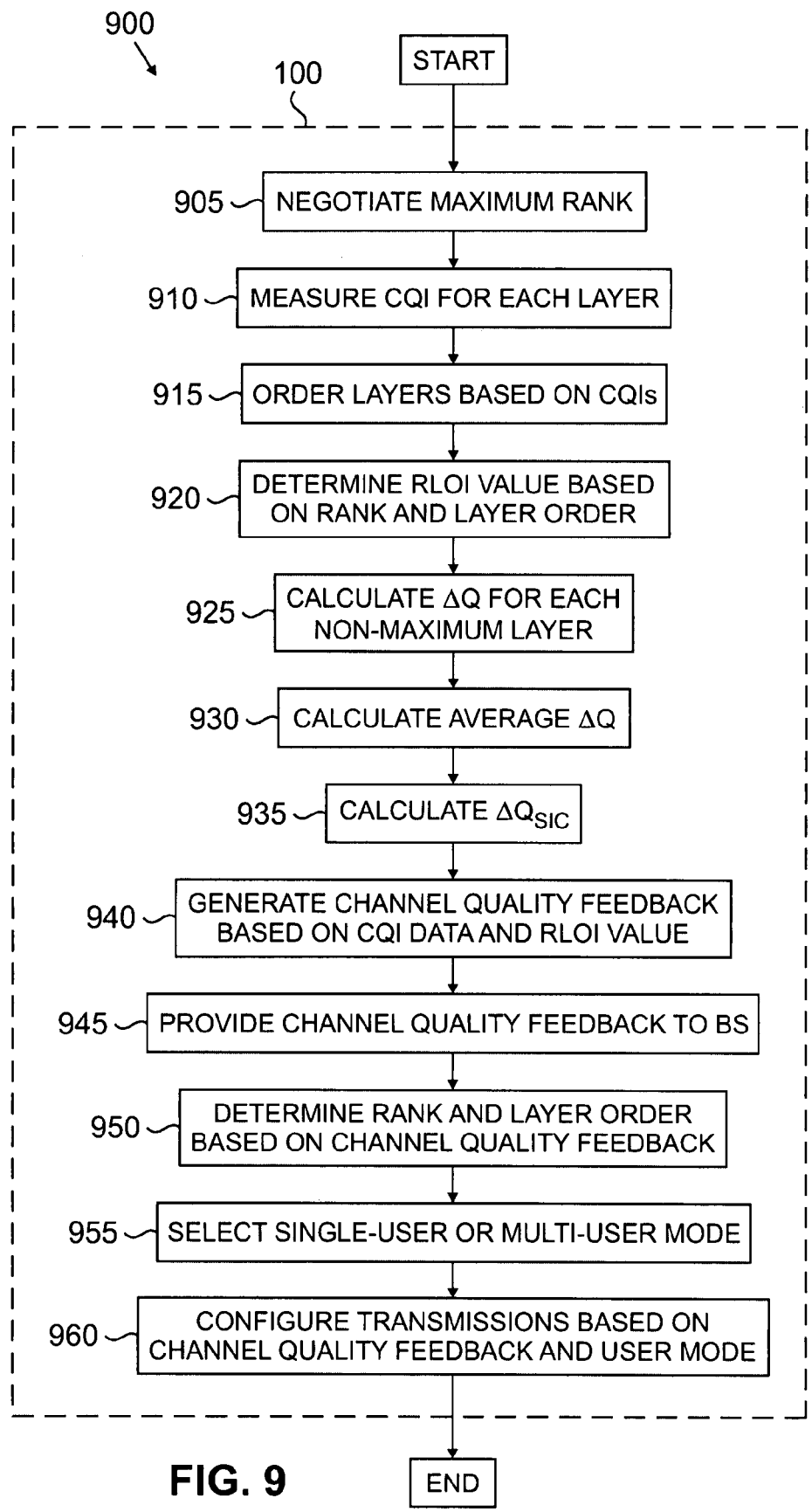
FIG. 9 is a flow diagram illustrating a method for managing channels of communication between the subscriber station of FIG. 3 and the base station of FIG. 2 according to an embodiment of the present disclosure.

FIG. 9 is a flow diagram illustrating a method 900 for managing channels of communication between subscriber station 111 and base station 102 according to an embodiment of the present disclosure. Initially, base station 102 and subscriber station 111 may negotiate a maximum rank (process step 905). As described above in connection with FIG. 8, for one embodiment, base station 102 and subscriber station 111 may negotiate a different rank for each sub-band.

Feedback provider 362 measures a CQI for each layer (process step 910) and orders the layers based on the CQIs (process step 915). Based on the layer order (which implicitly includes the rank), feedback provider 362 accesses RLOI table 363 to determine an RLOI value (process step 920).

For communication sessions with a rank greater than one, feedback provider 362 calculates a delta-CQI value for each non-maximum layer by determining the difference between each non-maximum layer's CQI and a next highest CQI (process step 925). For communication sessions with a rank greater than two, feedback provider 362 may calculate an average delta-CQI value based on the delta-CQI values (process step 930). For the embodiment in which feedback provider 362 is operable to determine a SIC gain, feedback provider 362 calculates a delta-CQIsjc value (process step 935).

Feedback provider 362 generates channel quality feedback based on the CQI data and the RLOI value (process step 940). For example, feedback provider 362 may generate channel quality feedback that comprises the maximum CQI, a delta-CQI value (for rank-2), an average delta-CQI value (for a rank greater than two), a delta-$CQI_{SIC}$ value (for embodiments in which this value is calculated), and the RLOI value. For an alternate embodiment, feedback provider 362 may generate channel quality feedback that comprises the maximum CQI, a delta-CQI value for each non-maximum layer (for ranks greater than one), a delta-$CQI_{SIC}$ value (for embodiments in which this value is calculated), and the RLOI value. Feedback provider 362 then provides the channel quality feedback to base station 102 (process step 945).

Configuration block 260 determines the rank and layer order based on the channel quality feedback (process step 950). For example, configuration block 260 identifies the RLOI value in the channel quality feedback and accesses RLOI table 265 to determine the rank and layer order based on the RLOI value. Configuration block 260 may then determine whether to implement a single-user MIMO mode or a multi-user MIMO mode (process step 955). Configuration block 260 then configures MIMO transmissions based on the channel quality feedback and selected user mode (process step 960). For example, configuration block 260 may implement codeword transmission structure 600 or 650 for single-user mode or codeword transmission structure 700 or 750 for multi-user mode. It will be understood that configuration block 260 may implement any other suitable codeword transmission structure.

In this way, the rank, layer order and channel quality information may be provided together, resulting in efficient transmission of this information. Accordingly, the amount of feedback overhead required to support multi-layer transmission is minimized. In addition, the network 100 supports a variable number of MIMO layer transmissions to the same subscriber station 111-116 and to different subscriber stations 111-116.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of managing channels in a wireless communication system, comprising:
selecting a rank and layer order indication (RLOI) value for a communication session from a plurality of RLOI values, each RLOI value associated with a different combination of a rank and a layer order;
generating channel quality feedback comprising a maximum channel quality indicator (CQI), a delta-CQI value at a subscriber station, and the (RLOI) value for the communication session, the maximum CQI comprising a maximum of a plurality of CQIs, each CQI corresponding to one of a plurality of layers; and
transmitting the channel quality feedback to a base station.

2. The method as set forth in claim 1, further comprising:
measuring the CQI for each of the plurality of layers; and
ordering the layers based on the CQI for each layer to generate a layer order for the communication session.

3. The method as set forth in claim 2, further comprising:
determining a rank for the communication session;
wherein the RLOI value for the communication session is selected based on the rank and the layer order for the communication session.

4. The method as set forth in claim 3, wherein the plurality of RLOI values is arranged in a table and an instance of the table is stored in the subscriber station and the base station.

5. The method as set forth in claim 3, the ordered layers comprising a maximum layer and at least one non-maximum layer, the maximum CQI comprising the CQI for the maximum layer, the method further comprising calculating an actual delta-CQI value for each non-maximum layer.

6. The method as set forth in claim 5, further comprising, when the rank is two, providing the actual delta-CQI value for the non-maximum layer as the delta-CQI value.

7. The method as set forth in claim 5, further comprising, when the rank is greater than two, calculating an average delta-CQI value based on the actual delta-CQI values and providing the average delta-CQI value as the delta-CQI value.

8. The method as set forth in claim 5, generating the channel quality feedback comprising generating the channel quality feedback comprising a plurality of delta-CQI values, the method further comprising, when the rank is greater than two, providing the actual delta-CQI values as the plurality of delta-CQI values.

9. The method as set forth in claim 1, the channel quality feedback comprising a single full CQI, the single full CQI comprising the maximum CQI.

10. The method as set forth in claim 1, further comprising:
calculating a delta-$CQI_{SIC}$ value, the delta-$CQI_{SIC}$ value operable to indicate a successive interference cancellation (SIC) gain; and
generating the channel quality feedback further comprising generating the channel quality feedback comprising the delta-$CQI_{SIC}$ value.

11. A method of managing channels, comprising:
selecting a rank and layer order indication (RLOI) value for a communication session from a plurality of RLOI values, each RLOI value associated with a different combination of a rank and a layer order;
generating channel quality feedback comprising a maximum channel quality indicator (CQI), a plurality of delta-CQI values at a subscriber station, and the (RLOI) value for the communication session, the maximum CQI comprising a maximum of a plurality of CQIs, each CQI corresponding to one of a plurality of layers; and
transmitting the channel quality feedback to a base station.

12. The method as set forth in claim 11, further comprising: measuring the CQI for each of the plurality of layers; and ordering the layers based on the CQI for each layer to generate a layer order for the communication session.

13. The method as set forth in claim 12, further comprising: determining a rank for the communication session; wherein the RLOI value for the communication session is selected based on the rank and the layer order for the communication session.

14. The method as set forth in claim 13, wherein the plurality of RLOI values is arranged in a table and an instance of the table is stored in the subscriber station and the base station.

15. The method as set forth in claim 13, the ordered layers comprising a maximum layer and at least one non-maximum layer, the maximum CQI comprising the CQI for the maximum layer, the method further comprising calculating an actual delta-CQI value for each non-maximum layer.

16. The method as set forth in claim 15, further comprising, when the rank is greater than two, calculating an average delta-CQI value based on the actual delta-CQI values and providing the average delta-CQI value as one of the delta-CQI values.

17. The method as set forth in claim 11, the channel quality feedback comprising a single full CQI, the single full CQI comprising the maximum CQI.

18. The method as set forth in claim 11, further comprising: calculating a delta-$CQI_{SIC}$ value, the delta-$CQI_{SIC}$ value operable to indicate a successive interference cancellation (SIC) gain; wherein the channel quality feedback further comprises the delta-$CQI_{SIC}$ value.

19. A subscriber station in a wireless communication system, comprising:
a memory;
a processor; and
a feedback provider, the feedback provider configured to:
select a rank and layer order indication (RLOI) value for a communication session from a plurality of RLOI values stored in the memory, each RLOI value associated with a different combination of a rank and a layer order;
generate channel quality feedback comprising a maximum channel quality indicator (CQI), a delta-CQI value at the subscriber station, and the (RLOI) value for the communication session, the maximum CQI comprising a maximum of a plurality of CQIs, each CQI corresponding to one of a plurality of layers; and
transmit the channel quality feedback to a base station.

20. The subscriber station as set forth in claim 19, the feedback provider further configured to:
measure the CQI for each of the plurality of layers; and
order the layers based on the CQI for each layer to generate a layer order for the communication session.

21. The subscriber station as set forth in claim 20, the feedback provider further configured to:
determine a rank for the communication session;
wherein the RLOI value for the communication session is selected based on the rank and the layer order for the communication session.

22. The subscriber station as set forth in claim 21, the ordered layers comprising a maximum layer and at least one non-maximum layer, the maximum CQI comprising the CQI for the maximum layer, the feedback provider further configured to calculate an actual delta-CQI value for each non-maximum layer.

23. The subscriber station as set forth in claim 22, the feedback provider further configured to provide the actual delta-CQI value for the non-maximum layer as the delta-CQI value when the rank is two.

24. The subscriber station as set forth in claim 22, the feedback provider further configured, when the rank is greater than two, to calculate an average delta-CQI value based on the actual delta-CQI values and to provide the average delta-CQI value as the delta-CQI value.

25. The subscriber station as set forth in claim 22, the feedback provider configured to generate the channel quality feedback further comprising a plurality of delta-CQI values and, when the rank is greater than two, to provide the actual delta-CQI values as the plurality of delta-CQI values.

26. The subscriber station as set forth in claim 19, the feedback provider further configured to:
calculate a delta-$CQI_{SIC}$ value, the delta-$CQI_{SIC}$ value operable to indicate a SIC gain; and
generate the channel quality feedback further comprising the delta-$CQI_{SIC}$ value.

* * * * *